United States Patent
Blaesing et al.

(10) Patent No.: US 8,723,954 B2
(45) Date of Patent: May 13, 2014

(54) CAMERA ARRANGEMENT FOR A MOTOR VEHICLE

(75) Inventors: Frank Blaesing, Werl (DE); Matthias Richwin, Dortmund (DE); Ralf Boebel, Holzwickede (DE); Thomas Weber, Ludenscheid (DE); Gregor Boehne, Castrop-Rauxel (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 1426 days.

(21) Appl. No.: 12/215,278

(22) Filed: Jun. 26, 2008

(65) Prior Publication Data

US 2008/0284850 A1 Nov. 20, 2008

Related U.S. Application Data

(63) Continuation-in-part of application No. PCT/EP2007/001898, filed on Mar. 6, 2007.

(30) Foreign Application Priority Data

Mar. 8, 2006 (DE) .......................... 10 2006 010 672

(51) Int. Cl.
*H04N 7/18* (2006.01)

(52) U.S. Cl.
USPC ........................................................ 348/148

(58) Field of Classification Search
USPC ........................................................ 348/148
See application file for complete search history.

(56) References Cited

U.S. PATENT DOCUMENTS

| | | | |
|---|---|---|---|
| 6,392,218 B1 * | 5/2002 | Kuehnle | 250/208.1 |
| 6,678,001 B1 * | 1/2004 | Elberbaum | 348/373 |
| 6,915,228 B2 * | 7/2005 | Uffenkamp et al. | 702/94 |
| 7,019,275 B2 * | 3/2006 | Stam et al. | 250/208.1 |
| 7,322,755 B2 | 1/2008 | Neumann et al. | |
| 2004/0008255 A1 * | 1/2004 | Lewellen | 348/148 |
| 2004/0144911 A1 * | 7/2004 | Stam et al. | 250/208.1 |
| 2005/0001901 A1 * | 1/2005 | Eggers et al. | 348/118 |
| 2005/0025360 A1 * | 2/2005 | Gin | 382/181 |
| 2006/0177098 A1 * | 8/2006 | Stam | 382/104 |
| 2007/0041725 A1 * | 2/2007 | Neumann et al. | 396/419 |
| 2007/0115357 A1 * | 5/2007 | Stein et al. | 348/148 |
| 2009/0085755 A1 * | 4/2009 | Schafer et al. | 340/602 |

FOREIGN PATENT DOCUMENTS

| | | |
|---|---|---|
| DE | 298 05 645 U1 | 6/1998 |
| DE | 197 23 858 A1 | 12/1998 |
| DE | 198 05 000 A1 | 8/1999 |
| DE | 103 40 901 A1 | 3/2005 |
| DE | 103 42 837 A1 | 4/2005 |
| DE | 103 55 205 A1 | 7/2005 |
| DE | 10 2004 018 215 A1 | 11/2005 |
| DE | 10 2004 024 735 A1 | 12/2005 |
| DE | 10 2004 057 322 A1 | 6/2006 |
| EP | 0 934 851 A2 | 8/1999 |
| WO | WO 2005/113293 A1 | 12/2005 |

\* cited by examiner

*Primary Examiner* — Ninos Donabed
(74) *Attorney, Agent, or Firm* — Brooks Kushman P.C.

(57) ABSTRACT

A camera arrangement for a vehicle includes a camera and an electrical conductor structure. The camera is separated from a pane which divides an outside region from an inside region. The camera is in the inside region and is pointed at a portion of the pane such that the camera has a viewing detection region through the pane. The conductor structure forms a device and is on the portion of the pane within the viewing detection region of the camera whereby the camera and the device use the same portion of the pane for their operations.

18 Claims, 1 Drawing Sheet

CAMERA ARRANGEMENT FOR A MOTOR VEHICLE

CROSS-REFERENCE TO RELATED APPLICATIONS

This is a continuation-in-part of International Application PCT/EP2007/001898, published in German, with an international filing date of Mar. 6, 2001, which claims priority to DE 10 2006 010 672.5, filed Mar. 8, 2006; the disclosures of which are both hereby incorporated by reference.

BACKGROUND OF THE INVENTION

1. Field of the Invention

The present invention relates to a camera arrangement having a camera pointed at a window and an electrical conductor structure connected to the window.

2. Background Art

Some sensors have to be mounted on a vehicle window such as a windshield for the sensors to monitor information regarding the space outside the window. This is especially true for cameras. However, rain sensors, fog sensors, and other optical sensors such as sunlight and ambient light sensors are typically located on a windshield.

DE 103 40 901 A1 describes a vehicle roof module having a camera. A component incorporated in the roof module forms a sensor. The camera and the sensor component are both located in the region of the windshield of the vehicle.

A camera and another sensor are designed as separate components due to different measurement principles and are located at different positions on a window. This results in a relatively large area of the window being occupied with the sensor devices which is detrimental for aesthetic and practical reasons. The camera and the sensor can be located within the same housing alongside one another. However, a large mounting area remains as the camera is located alongside the sensor.

SUMMARY OF THE INVENTION

An object of the present invention is a camera arrangement for a vehicle that advantageously makes use of mounting space on a window of the vehicle such as the windshield.

In carrying out the above object and other objects, the present invention provides a camera arrangement having a camera and an electrical conductor structure. The camera is separated from a pane which divides an outside region from an inside region. The camera is in the inside region and is pointed at a portion of the pane such that the camera has a viewing detection region through the pane. The conductor structure forms a device and is on the portion of the pane within the viewing detection region of the camera whereby the camera and the device use the same portion of the pane for their operations.

In embodiments of the present invention, a camera arrangement includes a camera and a conductor structure which forms a device (e.g., a sensor) with the conductor structure being located in the detection region of the camera. The camera is pointed towards a window such as a vehicle window (e.g., a windshield) and the conductor structure is arranged on the window. The conductor structure fills part of the detection region of the camera such that the camera is able to view through the conductor structure. As a result, the region of the window through which the camera views the space outside the window is simultaneously made usable for another application. That is, the camera and the sensor both use the same region of the window in carrying out their monitoring functions.

The conductor structure includes wires or printed conductor tracks. The wires and printed conductor tracks are non-transparent. As a result, the conductor structure is partially transparent and has regions of visible transparency. In an embodiment, the conductor structure is located on a transparent support such as a transparent foil.

The conductor structure may include geometrical arrangements of a conducting material which can be mounted on or in a window. For example, the conductor structure can form a simple conductor loop or have complex geometrical patterns such as spirals or sinuous patterns. The conductor structure may be formed as multiple components. The conductor structure can consist of partial structures that are galvanically separated from one another such as a capacitive interdigital structure.

In embodiments of the present invention, the conductor structure forms an electronic component of a sensor. For instance, the component forms an antenna, a coil, a capacitor, etc. The component can thus be a sensor or a part of a sensor. For example, the sensor can be a moisture sensor operating according to a capacitive measuring principle for detecting rain or condensation on a window.

The operating principle of a capacitive moisture sensor is based on water having a different dielectric property than air. As a result, when the sensor is inserted into an electromagnetic field, the sensor is measurably affected enabling moisture on a window to be detected. For example, impingement of water changes the capacitance of a stray field condenser such that an attached oscillator circuit undergoes a change in frequency.

Conductor structures such as antenna structures can likewise be mounted in or on a window. In both cases, these conductor structures can have relatively small widths depending on the manufacturing technique and/or may be almost transparent.

The conductor structure can form a heating device capable of removing condensation, which may disturb the operation of a camera arrangement, from a window. The conductor structure may include discrete electronic components or unmounted electronic circuits.

The conductor structure can be placed on the inner side of a window (i.e., on the same side of the window as the camera). Further, the conductor structure can be placed between two surfaces of a composite pane.

As indicated, a camera arrangement in accordance with embodiments of the present invention includes a camera and a conductor structure in which the camera is pointed at a window and the conductor structure is arranged in the detection region of the camera. In an embodiment, the conductor structure is directly attached to the camera. In another embodiment, the camera arrangement includes an optical element such as a prism or a light-guide which is in front of the camera between the camera and the window. The conductor structure is attached to the optical element and is in the detection region of the camera. As a result, it is possible to form a preassembled module from the camera and the conductor structure which enables a common camera and conductor structure assembly on the window and enables replacement of the camera module and the window independent of one another. The optical element can be formed as a tube filled with an optical material.

In an embodiment, the camera is focused at a maximum possible distance (i.e., towards infinity). Because focusing does not occur in the plane of the window, the conductor structure which is located on the window does not relevantly disturb the recording of images by the camera.

The camera can provide image recording functions such as lane recognition and non-image recording functions such as light sensor functions, in which only one piece of location-resolved brightness data is recorded. For example, non-image recording functions (i.e., non-image acquiring functions) include ambient light sensor, sun sensor, rain sensor, and condensation sensor functions.

DETAILED DESCRIPTION OF THE PREFERRED EMBODIMENT(S)

Figure 1:
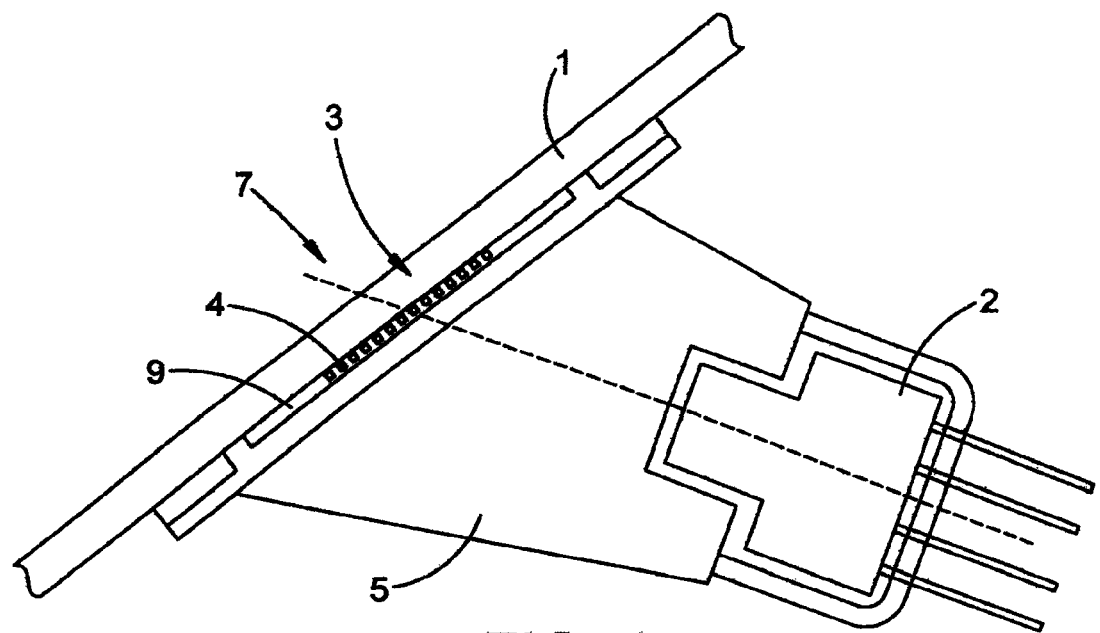
FIG. 1 illustrates a camera arrangement in accordance with an embodiment of the present invention.
Figure 2:
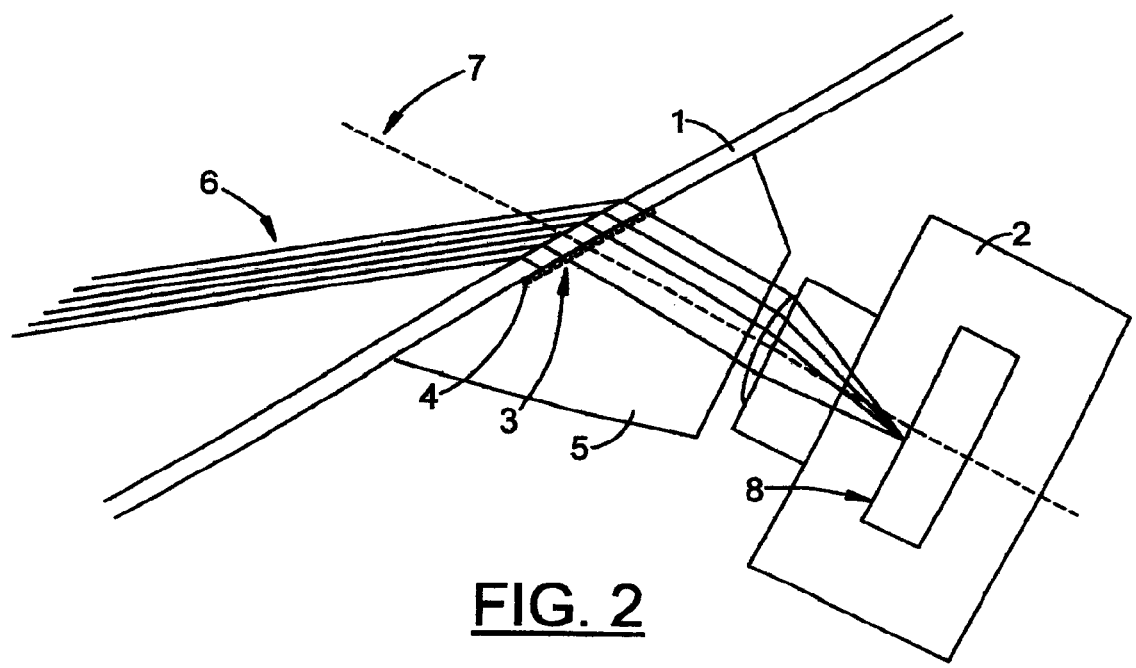
FIG. 2 illustrates the camera arrangement shown in FIG. 1.

Referring now to FIGS. 1 and 2, a camera arrangement in accordance with an embodiment of the present invention is shown. The camera arrangement is for use with a vehicle. The camera arrangement includes a camera 2 pointed at a vehicle window 1 such as a windshield. The camera arrangement is located on the inner side of window 1 (i.e., the camera arrangement is located in the vehicle).

The camera arrangement includes a light-guiding element 5. Light-guiding element 5 couples camera 2 to windshield 1. To this end, an outer surface of light-guiding element 5 is coupled to the inner side of windshield 1. Camera 2 is connected with the section of light-guiding element 5 opposite windshield 1. By these means, parts of light-guiding element 5 can advantageously be formed integrally with the camera optics.

Light-guiding element 5 has the same or similar index of refraction as window 1. For instance, light-guiding element 5 is made of the same material as window 1 such that light-guiding element 5 and window 1 have the same or similar index of refraction. As a result, the camera arrangement provides a nearly refraction-free passage of light from window 1 to light-guiding element 5 and camera 2. Light-guiding element 5 can be formed as a rigid prism element or as a tube filled with an optically transparent material. In either case, the side surfaces of light-guiding element 5 are opaque to prevent detrimental effects of scattered light. The side surfaces of light-guiding element 5 may be painted black to be opaque.

The camera arrangement further includes a conductor structure 3. Conductor structure 3 includes non-transparent printed conductor tracks 4. Printed conductor tracks 4 are arranged in a geometric pattern such that conductor structure 3 is partially transparent with regions of visible transparency. For instance, lines of intersection made by printed conductor tracks 4 of conductor structure 3 are illustrated in FIG. 1, which would be represented as a spiral, for example, in a top view for an inductive sensor and for a capacitive sensor as an interdigital structure.

Conductor structure 3 is mounted on window 1 within the viewing detection region of camera 2. In particular, in the viewing direction of camera 2, i.e., in the direction of optical axis 7 of camera 2, conductor structure 3 is mounted on or formed in a transparent support 9 in the region of window 1. Conductor structure 3, together with a circuit arrangement, performs the function of a sensor such as a moisture sensor. Transparent support 9 has the same or similar index of refraction as window 1.

FIG. 2 clarifies the imaging ray trajectories of the camera arrangement. Camera 2 is focused at a long distance (i.e., in the direction of infinity). This means that parallel light beams 6 incident to window 1 are respectively imaged at a single point in imaging plane 8 of camera 2. The position of the image point in imaging plane 8 varies with the angle of incidence of light beams 6 on window 1.

Due to the focus of camera 2 towards infinity, conductor structure 3 located on or in the vicinity of the plane of window 1 is not imaged by camera 2. As such, camera 2 is able to view through the transparent regions of conductor structure 3.

In particular, as shown in FIG. 2, non-transparent printed conductor tracks 4 of conductor structure 3 prevent individual light rays of parallel light beams 6 incident to window 1 from reaching camera 2. This causes the intensity of the image detected by camera 2 to be somewhat diminished. In addition, slight refractive effects at the edges of printed conductor tracks 4 can result, but they have a negligible effect on the detection of the image. Transparent support 9 (shown in FIG. 1 in exaggerated thickness) has no significant effect on the light path due to its index of refraction since the light path through support 9 is relatively short.

As a result, camera 2 is capable of readily viewing through conductor structure 3 located in its field of view without image acquisition by camera 2 being relevantly affected.

REFERENCE NUMBERS

1 Vehicle window
2 Camera
3 Conductor structure
4 Conductor tracks
5 Light-guiding element
6 Light beam
7 Optical axis
8 Imaging plane
9 Support While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A camera arrangement comprising:
    a camera separated from a pane which divides an outside region from an inside region, wherein the camera is in the inside region and is pointed at a portion of the pane such that the camera has a viewing detection region through the pane; and
    an electrical conductor structure which forms a device, wherein the conductor structure is in front of the camera on the portion of the pane within the viewing detection region of the camera such that the camera is pointed at both the portion of the pane and the conductor structure whereby the camera and the device use the same portion of the pane for their operations;
    an optical element connected to the pane, wherein the optical element is between the camera and the pane and is in front of the camera;
    wherein the conductor structure is on the portion of the pane within the viewing detection region of the camera and is completely within an area covered by the optical element on the pane.

2. The arrangement of claim 1 wherein:
    the conductor structure includes transparent regions and non-transparent regions, wherein the camera is able to view through the transparent regions.

3. The arrangement of claim 1 wherein:
the conductor structure includes a transparent support which is on the portion of the pane within the viewing detection region of the camera.

4. The arrangement of claim 3 wherein:
the conductor structure further includes non-transparent printed conductor tracks which are on the transparent support and form the device;
wherein the transparent support and the non-transparent printed conductor tracks enable the conductor structure to have transparent and non-transparent regions, wherein the camera is able to view through the transparent regions.

5. The arrangement of claim 3 wherein:
the transparent support has a refraction index substantially similar to the refraction index of the pane.

6. The arrangement of claim 1 wherein:
the conductor structure is on the side of the portion of the pane facing the inside region.

7. The arrangement of claim 1 wherein: the optical element is a prism.

8. The arrangement of claim 1 wherein: the optical element is a light-guiding element.

9. The arrangement of claim 1 wherein: the optical element includes a tube filled with an optically transparent material.

10. The arrangement of claim 1 wherein:
the camera is focused on a plane lying in the outside region away from the pane.

11. The arrangement of claim 1 wherein:
the device formed by the conductor structure is a moisture sensor.

12. The arrangement of claim 1 wherein:
the device formed by the conductor structure is a heater.

13. The arrangement of claim 1 wherein:
the pane is a vehicle window.

14. The arrangement of claim 13 wherein:
the vehicle window is a windshield.

15. A camera arrangement comprising:
a camera separated from a pane which divides an outside region from an inside region, wherein the camera is in the inside region and is pointed at a portion of the pane such that the camera has a viewing detection region through the pane;
an electrical conductor structure which forms a device, wherein the conductor structure is between the pane and the camera and is in front of the camera on the portion of the pane within the viewing detection region of the camera such that the camera is pointed at both the portion of the pane and the conductor structure whereby the camera and the device use the same portion of the pane for their operations; and
a light-guiding element connected to the pane, wherein the light-guiding element is between the camera and the pane and is in front of the camera;
wherein the conductor structure is connected to the light-guiding element such that the conductor structure is on the portion of the pane within the viewing detection region of the camera and is completely within an area covered by the light-guiding element on the pane.

16. The arrangement of claim 15 wherein:
the pane is one of a vehicle window and a windshield.

17. A camera arrangement comprising:
a camera separated from a pane which divides an outside region from an inside region, wherein the camera is in the inside region and is pointed along an optical axis at a portion of the pane such that the camera has a viewing detection region through the pane;
an electrical conductor structure which forms a device, wherein the conductor structure is between the pane and the camera and is in front of the camera on the portion of the pane along the optical axis of the camera within the viewing detection region of the camera such that the camera is pointed along the optical axis at both the portion of the pane and the conductor whereby the camera and the device use the same portion of the pane for their operations; and
a light-guiding element connected to the pane, wherein the light-guiding element is between the camera and the pane and is in front of the camera;
wherein the conductor structure is connected to the light-guiding element such that the conductor structure is on the portion of the pane along the optical axis of the camera within the viewing detection region of the camera and is completely within an area covered by the light-guiding element on the pane.

18. The arrangement of claim 17 wherein:
the pane is one of a vehicle window and a windshield.

* * * * *